Oct. 1, 1968   J. J. CIOKAJLO   3,403,889
FRAME ASSEMBLY HAVING LOW THERMAL STRESSES
Filed June 26, 1967
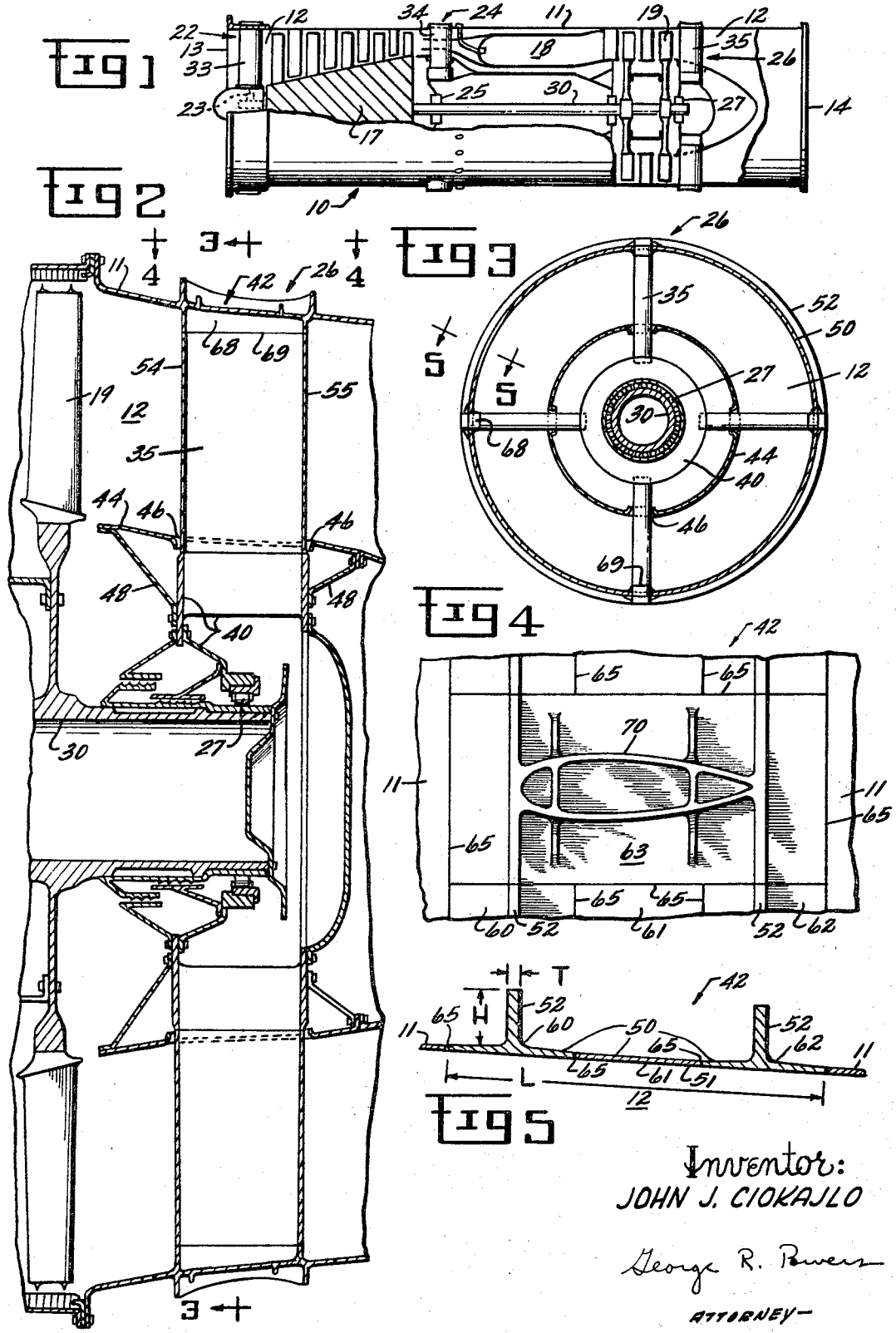
Inventor:
JOHN J. CIOKAJLO
George R. Powers
ATTORNEY United States Patent Office 3,403,889
Patented Oct. 1, 1968

3,403,889
FRAME ASSEMBLY HAVING LOW
THERMAL STRESSES
John J. Ciokajlo, Loveland, Ohio, assignor to General
Electric Company, a corporation of New York
Continuation-in-part of application Ser. No. 540,945, Apr.
7, 1966. This application June 26, 1967, Ser. No.
648,756
5 Claims. (Cl. 253—39)

ABSTRACT OF THE DISCLOSURE

A gas turbine engine includes a frame assembly in which struts extend across an annular motive fluid passage to interconnect inner and outer frame members, the outer frame member being annular and forming a portion of the wall structure defining the outer boundary of the motive fluid passage. The configuration of the frame assembly, and particularly that of the outer frame member, is such that thermal stresses are not excessive during either transient or steady state engine operation.

---

This patent application is a continuation-in-part of a now abandoned application entitled, "Frame Structure," Ser. No. 540,945, filed on Apr. 7, 1966, in the name of John J. Ciokajlo and assigned to the assignee of this invention.

This invention relates to a frame assembly for a gas turbine engine and, more particularly, to a frame assembly in which the frame members are dimensioned and interconnected such that thermal stresses therein are maintained at low levels throughout engine operation.

A gas turbine engine typically includes several frame assemblies having struts extending across the motive fluid passageway to interconnect inner and outer frame members. The frame assemblies maintain the various stator components in fixed positions relative to each other and support, among other things, the rotor bearings and, hence, the engine rotor. For suitable performance, it is essential that the frame assemblies be substantially rigid in order to maintain concentricity and small operating clearances between the relatively rotating rotor and the fixed stator at all times. For dependability and long life, it is also desirable that thermal stresses in engine components, including the frame assemblies, be maintained at low levels throughout transient and steady state engine operation. In addition, it is essential in gas turbine engines used for aircraft propulsion that the foregoing characteristics be provided by a lightweight and efficient engine design.

In typical gas turbine engines, the components forming the turbine frame at the high temperature end of the engine are exposed to rapid and extreme variations in operating temperature during transient operation. For example, during engine starting when the exhaust temperature is rising rapidly, the struts in typical frame assemblies are heated at a much faster rate than the outer frame member. As a result, the struts expand at a greater rate and try to "poke through" the outer frame member, causing high bending streses in the outer frame member. Rapid cooling of the struts during shut down of the engine results in similar bending stresses in the outer frame member. Because of these high thermal stresses, typical frame assemblies are subject to failure through cracking of the outer frame member. To prevent such failure, the outer frame member can be made more rugged in order to reduce the thermal stress levels and thereby reduce cracking. However, this approach adds significantly to the overall weight of the engine and is, therefore, generally unsatisfactory for use in power plants intended for aircraft use. Another approach used in the past for preventing such failure has been to extract motive fluid from the engine cycle for heating and cooling the outer frame structure at rates more closely approximating those of the struts. Since this approach requires the extraction of considerable amounts of energy from the motive fluid, the engine efficiency is somewhat reduced from that desired for aircraft engines.

It is therefore an object of this invention to provide an improved frame assembly for gas turbine engines.

Another object of this invention is to provide an improved frame assembly that is characterized by low thermal stresses throughout engine operation.

Yet another object is to provide for aircraft gas turbine engines a turbine frame assembly that is characterized by low thermal stresses without reducing the overall operating efficiency of the engine.

A further object is to provide the foregoing objects in a relatively lightweight turbine frame assembly of simple and reliable construction.

Briefly stated, in carrying out the invention in one form, an engine frame assembly is comprised of inner and outer frame members interconnected by struts extending across the motive fluid stream of the engine. The outer frame member includes a generally cylindrical ring portion having an inner surface defining at least a portion of the outer boundary of motive fluid stream and at least one circumferential rib formed integrally with the ring portion and projecting outwardly therefrom, the rib being axially located relative to the struts to impart substantial rigidity to the assembly. To reduce thermal stresses in the outer frame member during operation, the circumferential rib has a cross-sectional configuration in which the thickness of the rib at any given position is at least as great as the thickness at any position radially outward of the given position. As a result, the entire rib can be quickly heated or cooled through conduction of heat from or to the cylindrical ring portion, which is in direct contact with the motive fluid. By further aspects of the invention, substantially uniform heating and cooling of the entire outer ring member is assured by careful dimensioning of the cylindrical ring portion and the circumferential rib. More particularly, the ratio of the radial height of the rib to its axial thickness should be less than 10 to 1 and the axial length of the cylindrical ring portion should be at least equal to radial height of the circumferential rib.

By a still further aspect of the invention, the outer frame member is formed by a plurality of abutting segments joined into an integral structure by butt welds, and the struts are similarly butt welded to the outer frame member such that the complete assembly can be visually inspected. In addition, the butt welded segments are characterized by relatively uniform heat conduction properties since the segments are of relatively uniform thickness and the welds are continuous.

While the novel features of the invention are set forth with particularity in the appended claims, the invention, both as to organization and content, will be better understood and appreciated, along with other features thereof, from the following detailed description when taken in conjunction with the drawing, in which:

FIG. 1 is a view, partially broken away and in cross-section, of a gas turbine engine having a turbine frame assembly formed in accordance with the invention;

FIG. 2 is a fragmentary view illustrating the turbine frame assembly of FIG. 1 in larger scale;

FIG. 3 is a view of the turbine frame assembly taken along viewing line 3—3 of FIG. 2;

FIG. 4 is a view taken along viewing line 4—4 of FIG. 2;

FIG. 5 is an enlarged view in cross-section of a portion of the outer frame member of the turbine frame assembly taken along viewing line 5—5 of FIG. 3.

Referring first to FIG. 1, a portion of a gas turbine engine 10 is illustrated in cross-section, the engine 10 including an outer casing 11 surrounding an annular passageway 12 extending axially between an inlet 13 and an exhaust outlet 14 at opposite ends of the engine 10. During engine operation, ambient air is drawn into the inlet 13 and is compressed to a higher pressure in a compressor 17, from which the compressed air is discharged into an annular combustor 18 where fuel is burned to produce high energy products of combustion. From the combustor 18, the motive fluid is directed through a turbine 19 where a portion of its energy is extracted to drive the compressor 17, and the fluid is then discharged as a high energy stream through the exhaust nozzle 14.

To maintain the various components of the engine 10 in the proper operating positions relative to each other, frame assemblies are provided for rigidly interconnecting the stator components and for providing bearing supports for the rotor. More particularly, the engine 10 includes a front frame assembly 22 supoprting a front bearing 23, a mid-frame assembly 24 supporting a mid-shaft bearing 25, and a turbine frame 26 supporting an aft bearing 27, the rotor 30 being rotatably mounted in the bearing, 23, 25, and 27. The frame assemblies 22, 24, and 26 include pluralities of airfoil shaped struts 3, 34, and 35, respectively, which project across the annular passageway 12 to interconnect the inner and outer frame members of the assemblies. Since the temperature of the motive fluid flowing through the passageway 12 changes very rapidly during transient engine operation, it will occur to those skilled in the art that substantial thermal stresses can be created in the rigid frame assemblies in the event that the struts are allowed to heat up and cool down at rates differing substantially from those of the inner and outer frame members. This is particularly true with respect to the turbine frame assembly 26 since the exhaust gases are subject to the most rapid and greatest changes in operating temperatures. For this reason, the present invention, which prevents destructive thermal stresses, is illustrated in conjunction with the turbine frame 26. Those skilled in the art, however, will appreciate that the present invention is equally applicable to other rigid assemblies, such as the frames 22 and 24, exposed to motive fluid characterized by substantial and rapid changes in temperature.

Referring now to FIGS. 1–3, the turbine frame 26 is comprised of an inner frame member 40 carrying the aft bearing 27, an annular outer frame member 42 surrounding the motive fluid passageway 12, and the plurality of struts 35. The struts 35, which are secured to the outer frame member 42 at peripherally spaced-apart points, extend radially inward therefrom across the pasageway 12 and are secured to the inner frame member 40 as illustrated by FIG. 3. If desired, the struts may be tangentially secured to the inner frame member 40 as an alternative arrangement. The inner boundary of the passageway 12 in the vicinity of the turbine frame assembly 26 is defined by an inner casing 44 which surrounds the inner frame member 40, the inner casing 44 having openings 46 therein through which the struts 35 slidingly project. The inner casing 44, which is flexibly connected to the inner frame member 40 by support members 48, is thus free to expand and contract in response to temperature changes in the hot gases flowing through the passageway 12. In other words, the inner casing 44 is supported by, but is not a portion of, rigid turbine frame 26.

Turning attention now to FIGS. 2–5, the outer frame member 42 will be described in detail. As illustrated, the annular frame member 42 includes a generally cylindrical ring portion 50 having an inner surface 51 defining the outer boundary of the passageway 12 in the vicinity of the frame assembly 26. For the reasons discussed below, the area of this inner surface, which is proportional to its axial length L, is as large as reasonably possible in the practice of the invention. To provide the required rigidity without expressive weight, the cylindrical ring portion 50 is made relatively thin and circumferential support ribs 52 are provided for rigidity, the ribs 52 being integrally formed with the ring portion 50 and projecting radially outward thereof. The ribs 52 are, of course, axially located relative to the struts 35 to provide maximum rigidity. Where two ribs 52 are used as illusrated, they are preferably aligned axially with the leading and trailing edges 54 and 55, respectively, of the struts.

By the present invention, the dimensions of the components of the outer frame member 42 are maintained within specified ranges in order to maintain low thermal stresses during engine operation. More particularly, the circumferential ribs 52 are formed such that their axial thickness T at any position is at least as great as the thickness at any point outwardly of the given position. In other words, the ribs 52 may be of uniform thickness as illustrated or of decreasing thickness in the radially outward direction as provided by tapered or hyperbolic wall surfaces, but may not increase in thickness in the outward direction. In addition, the ratio of the radial height H of the ribs 52 to their average thickness is less than 10 to 1, and the axial length L of the ring portion 50 is at least equal to the combined radial heights H of the ribs 52. Furthermore, the ribs 52 and the ring portion 50 are interconnected with gradual and liberal radii for permitting substantially unrestricted flow of heat therethrough. These geometric relationships assure that changes in motive fluid temperature acting on the exposed inner surface 51 of the ring portion are quickly transmitted throughout the entire outer frame member 42, including the outer portions of the circumferential stiffening ribs 52. As a result, severe thermal stresses are not created since the outer frame member expands and contracts in an essentially uniform manner in response to temperature changes.

By way of example, an actual turbine frame constructed in accordance with the present invention includes a cylindrical ring portion 50 having an axial length L of 6.000 inches and a thickness of 0.045 inch and two circumferential ribs 52 each having a uniform thickness T of 0.180 inch and a radial height H of approximately 1.000 inch. In this case, the ratio of H to T is 5.56 and the axial length L of six inches is substantially greater than the combined radial height H of approximately two inches.

The manner by which the turbine frame assembly 26 is fabricated into an integral, rigid assembly also contributes significantly to the maintenance of low thermal stresses during transient engine operation. As illustrated by FIGS. 4 and 5, the outer frame member 42 is comprised of a plurality of segments 60, 61, 62, and 63 butt welded to form the integral frame member. The butt welded joints 65 provide a member having a continuous metallic structure of substantially uniform thickness. As a result, heat conduction is substantially uniform throughout the outer frame member 42 since there are no regions of multiple metal thickness and no interfaces between separate layers of metal. In other words, the butt welded joints 65 between the segments have low resistance to heat flow. In addition, the butt welded construction permits visual inspection of the entire outer frame member. Similarly, the segments 63 include inner extensions 68 to which the airfoil shaped struts 35 are secured by butt welded joints 69. These joints 69 are also characterized by uniform heat conduction and may be visually inspected. Additional support structure 70 may be provided, if desired, immediately outward of the struts 35.

From the foregoing, it will be apparent that an improved frame assembly characterized by low thermal stresses throughout engine operation is provided by the present invention. Furthermore, the improved frame assembly is relatively lightweight and does not adversely affect engine operating efficiency.

It will be understood that the invention is not limited to the specific details of the construction and arrangement of the particular embodiment illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. In a gas turbine engine having an annular passage for the flow of a hot gas stream, a frame assembly comprising,
   an inner frame member disposed within said annular passage,
   an outer thin-walled, cylindrical, frame member coaxially surrounding said inner frame member, the inner surface of said cylindrical member defining the outer boundary of the gas stream flow path past said frame,
   a plurality of angularly spaced struts extending through said annular flow path and interconnecting said inner and outer frame members, said struts being of airfoil cross section and generally aligned axially of said frames,
   said outer frame member having two, circumferential ribs generally aligned with the leading and trailing edges of said struts, and
   a casing comprising a cylindrical portion defining the inner boundary of said hot gas stream flow path past said frame, said cylindrical portion being relatively movable relative to said struts adjacent the inner ends thereof,
   whereby the thermal growth of the inner frame member is minimized and the thermal growth of the outer ends of said struts and said outer frame are approximately equal, thereby minimizing thermal stresses therebetween.

2. A frame assembly as defined by claim 1 in which said outer frame member is comprised of a plurality of abutting segments joined into an integral structure by butt welds, whereby the fabrication of said outer frame member may be inspected visually and whereby the joints between abutting segments have low resistance to flow of heat therethrough.

3. A frame assembly as defined by claim 2 in which said struts are airfoil-shaped in cross-section and in which said ring portion has a plurality of inward extensions butt welded to respective ones of said struts to form an integral structure therewith, whereby the joints between said struts and said outer frame member may be inspected visually.

4. A frame assembly as defined by claim 1 in which the ratio of the radial height of said circumferential rib to the average axial thickness of said circumferential rib is less than 10 to 1.

5. A frame assembly as defined by claim 4 in which the axial length of said cylindrical ring portion is at least equal to the radial height of said circumferential rib.

References Cited

UNITED STATES PATENTS

| | | | |
|---|---|---|---|
| 2,445,661 | 7/1948 | Constant et al. | |
| 2,616,662 | 11/1952 | Mierley. | |
| 2,643,085 | 6/1953 | Durkin et al. | |
| 2,702,985 | 3/1955 | Howell | 230—122 |
| 2,771,622 | 11/1956 | Thorp | 253—78 |
| 2,923,125 | 2/1960 | Rainbow. | |
| 3,269,700 | 8/1966 | Shainess | 253—78 |
| 3,319,930 | 5/1967 | Howald | 253—78 |

EVERETTE A. POWELL, Jr., *Primary Examiner.*